(12) United States Patent
Agarwal

(10) Patent No.: US 7,358,293 B2
(45) Date of Patent: Apr. 15, 2008

(54) THERMOPLASTIC POLYCARBONATE COMPOSITIONS WITH IMPROVED OPTICAL SURFACE QUALITY, ARTICLES MADE THEREFROM AND METHOD OF MANUFACTURE

(75) Inventor: Naveen Agarwal, Evansville, IN (US)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 11/216,924

(22) Filed: Aug. 31, 2005

(65) Prior Publication Data

US 2006/0247356 A1 Nov. 2, 2006

Related U.S. Application Data

(60) Provisional application No. 60/676,897, filed on May 2, 2005.

(51) Int. Cl.
*C08L 51/00* (2006.01)
*C08L 69/00* (2006.01)
*C08H 3/22* (2006.01)

(52) U.S. Cl. ............... 524/504; 524/451; 524/502; 524/515; 525/67

(58) Field of Classification Search ......... 524/515, 524/502, 504, 451; 525/67
See application file for complete search history.

(56) References Cited

U.S. PATENT DOCUMENTS

| | | | |
|---|---|---|---|
| 3,553,158 A | 1/1971 | Gilfillan et al. | |
| 5,162,419 A | 11/1992 | Pottier-Metz et al. | |
| 5,336,701 A | 8/1994 | Wildi et al. | |
| 5,380,795 A | 1/1995 | Gosens et al. | |
| 6,613,820 B2 | 9/2003 | Fujiguchi et al. | |
| 6,737,465 B2 | 5/2004 | Seidel et al. | |
| 7,105,592 B2 | 9/2006 | Warth et al. | |
| 2003/0008964 A1 | 1/2003 | Seidel et al. | |
| 2003/0083418 A1 | 5/2003 | Warth et al. | |
| 2003/0083419 A1 | 5/2003 | Seidel et al. | |

FOREIGN PATENT DOCUMENTS

| | | |
|---|---|---|
| EP | 0640655 A2 | 12/1999 |
| JP | 08176339 A2 | 7/1996 |
| JP | 2004 059898 A | 2/2004 |

OTHER PUBLICATIONS

PCT International Search Report for International Application No. PCT/US2006/014985.
EP 0640655 A2; English Abstract; only 1 page; publication date: Mar. 1, 1995.
JP 08176339 A2; English Abstract; only 1 page; publication date: Jan. 20, 1998.
Specialty Minerals, Inc.; "TALC-9100 Series"; 2002; www.mineralstech.com.
Specialty Minerals, Inc.; MICROTALC talc, Technical Grade Talcs; 1998; www.mineralstech.com.
McDonald, Roderick, Ed.; "Colour Physics for Industry";Second Edition; 1997; Society for Dyers and Colourists.
Eppeldauer, George, "Spectral Response Based Calibration Method of Tristimulus Colorimeters"; Journal of Research of the National Institute of Standards and Technology; vol. 103, No. 6, Nov.-Dec. 1998, pp. 615-618.

*Primary Examiner*—Fred Teskin

(57) ABSTRACT

A thermoplastic composition contains a polycarbonate resin, an aromatic vinyl copolymer, an impact modifier and a mineral filler, wherein the composition has a lightness L* of greater than or equal to about 70 under one or more of CIE $D_{65}$, CWF-2 or C illumination using a 2° observer at 360 to 750 nanometers (nm), including specular components. Alternatively, a thermoplastic composition may contain a polycarbonate resin, a vinyl aromatic copolymer, an impact modifier and a mineral filler, and less than or equal to about 400 parts per million iron, by weight of the composition. An article may be formed by molding, extruding, shaping or forming such a composition to form the article.

21 Claims, No Drawings

THERMOPLASTIC POLYCARBONATE COMPOSITIONS WITH IMPROVED OPTICAL SURFACE QUALITY, ARTICLES MADE THEREFROM AND METHOD OF MANUFACTURE

CROSS-REFERENCE TO RELATED APPLICATION

This application claims the benefit of U.S. provisional application No. 60/676,897, filed May 2, 2005.

BACKGROUND OF THE INVENTION

This invention is directed to thermoplastic compositions comprising an aromatic polycarbonate, and in particular impact-modified thermoplastic polycarbonate compositions having improved surface quality.

Polycarbonates are useful in the manufacture of articles and components for a wide range of applications, from automotive parts to electronic appliances. Because of their broad use, particularly in electronic applications, it is desirable to provide polycarbonates with good surface appearance.

One defect encountered in injection molded, filled polymeric material is splay. Splay is manifested as streaking or pale marks at areas on the molded article, particularly adjacent to the location of the mold gate. It is believed that splay occurs when the filled polymeric material is injected into a molding cavity and the material encounters high shear stresses caused by the combination of thickness or dimension variation between the runner and the gate, injection pressure, and a temperature drop from a molten state to the mold temperature. The temperature drop increases the melt viscosity of the filled material, especially at the surface, or skin where splay is manifested.

There remains a need to reduce or eliminate the surface defect of splay that is encountered in molding mineral filled polymeric material, and to provide filled materials with improved surface optical properties.

SUMMARY OF THE INVENTION

A thermoplastic composition comprises a polycarbonate resin, an aromatic vinyl copolymer, an impact modifier, and a mineral filler, wherein the composition has a lightness L* of greater than or equal to about 70 under one or more of CIE $D_{65}$, CWF-2 or C illumination using a 2° observer at 360 to 750 nanometers (nm), including specular components.

In an alternative embodiment, a thermoplastic composition comprises a polycarbonate resin, an aromatic vinyl copolymer, an impact modifier and a mineral filler, wherein the composition contains less than or equal to about 400 parts per million iron, by weight of the composition.

An article may be formed by molding, extruding, shaping or forming such a composition to form the article.

One method for forming an article comprises molding, extruding, shaping or forming the composition to form the article.

The above-described and other features are exemplified by the following detailed description.

DETAILED DESCRIPTION OF THE INVENTION

A thermoplastic composition comprising a polycarbonate resin, an aromatic vinyl copolymer, an impact modifier and a mineral filler has been found to exhibit good visual and optical characteristics. In some embodiments the composition exhibits improved colorability, as may be measured in terms of any one or more of lightness, chroma, hue, redness/greenness and blueness/yellowness of pigmented and non-pigmented compositions. Some embodiments exhibit substantially no splay upon molding. These advantages are achieved by limiting or eliminating from the compositions one or more impurities such as iron and/or aluminum and, optionally, one or more other impurities disclosed herein. The compositions are therefore sometimes referred to as "low impurity compositions."

As used herein, the terms "polycarbonate" and "polycarbonate resin" mean compositions having repeating structural carbonate units of the formula (1):

(1)

in which at least about 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

$$-A^1-Y^1-A^2 \qquad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO-$R^1$—OH, which includes dihydroxy compounds of formula (3)

$$HO-A^1-Y^1-A^2-OH \qquad (3)$$

wherein $Y^1$, $A^1$ and $A^2$ are as described above. Also included are bisphenol compounds of general formula (4):

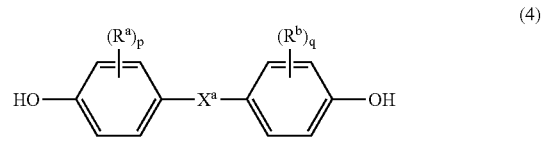

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

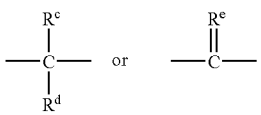

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents may be added at a level of about 0.05 wt. % to about 2.0 wt. %. All types of polycarbonate end groups are contemplated as being useful in the polycarbonate composition, provided that such end groups do not significantly affect desired properties of the thermoplastic compositions.

"Polycarbonates" and "polycarbonate resins" as used herein further includes blends of polycarbonates with other copolymers comprising carbonate chain units. A specific suitable copolymer is a polyester carbonate, also known as a copolyester-polycarbonate. Such copolymers further contain, in addition to recurring carbonate chain units of the formula (1), repeating units of formula (6)

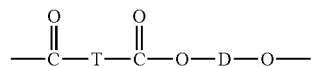

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In one specific embodiment, the polycarbonate is a linear homopolymer derived from bisphenol A, in which each of $A^1$ and $A^2$ is p-phenylene and $Y^1$ is isopropylidene.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-188}$ aryloxy group. An effective amount of a phase transfer catalyst may be about 0.1 to about 10 wt. % based on the weight of bisphenol in the phosgenation mixture. In another embodiment an effective amount of phase transfer catalyst may be about 0.5 to about 2 wt. % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

The copolyester-polycarbonate resins may also be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

In addition to the polycarbonates described above, it is also possible to use combinations of the polycarbonate with other thermoplastic polymers, for example combinations of polycarbonates and/or polycarbonate copolymers with polyesters. As used herein, a "combination" is inclusive of all mixtures, blends, alloys, and the like. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

In one embodiment, poly(alkylene terephthalates) are used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters.

The blends of a polycarbonate and a polyester may comprise about 1 to about 99 wt. % polycarbonate and correspondingly about 99 wt. % to about 1 wt. % polyester, in particular a poly(alkylene terephthalate), by weight of the polycarbonate and polyester. In one embodiment, the blend comprises about 30 wt. % to about 70 wt. % polycarbonate and correspondingly about 70 wt. % to about 30 wt. % polyester. The foregoing amounts are base on the total weight of the polycarbonate resin and polyester resin.

The thermoplastic composition further includes one or more impact modifier compositions to increase the impact resistance of the thermoplastic composition. These impact modifiers may include an elastomer-modified graft copolymer comprising (i) an elastomeric (i.e., rubbery) polymer substrate having a Tg less than about 10° C., more specifically less than about −10° C., or more specifically about −40° C. to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates;

elastomeric copolymers of $C_{1-8}$ alkyl(meth)acrylates with butadiene and/or styrene; or combinations comprising at least one of the foregoing elastomers.

Suitable conjugated diene monomers for preparing the elastomer phase are of formula (8):

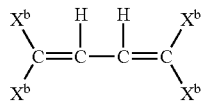

(8)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (9):

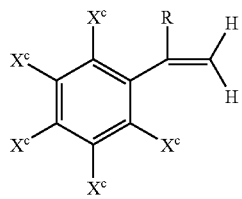

(9)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (10):

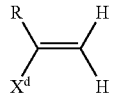

(10)

wherein R is hydrogen, $C_1$-$C_5$ alkyl, bromo, or chloro, and $X^d$ is cyano, $C_1$-$C_{12}$ alkoxycarbonyl, $C_1$-$C_{12}$ aryloxycarbonyl, hydroxy carbonyl, or the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl(meth) acrylate, ethyl(meth)acrylate, n-butyl(meth)acrylate, t-butyl (meth)acrylate, n-propyl(meth)acrylate, isopropyl(meth) acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl(meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt. % of comonomers of formulas (8), (9), or (10). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl(meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber latices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70%. Also suitable are mixtures of butadiene with styrene and/or $C_{4-6}$ alkyl acrylate rubbers.

The elastomeric phase may provide about 5 wt. % to about 95 wt. % of the total graft copolymer, more specifically about 20 wt. % to about 90 wt. %, and even more specifically about 40 wt. % to about 85 wt. % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (9) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (10). In one embodiment, R is hydrogen or $C_1$-$C_2$ alkyl, and $X^d$ is cyano or $C_1$-$C_{12}$ alkoxycarbonyl. Specific examples of suitable comonomers for use in the rigid phase include acrylonitrile, ethacrylonitrile, methacrylonitrile, methyl (meth)acrylate, ethyl(meth)acrylate, n-propyl(meth) acrylate, isopropyl (meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt. % of monovinyl aromatic monomer, specifically about 30 to about 100 wt. %, more specifically about 50 to about 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 wt. % to about 95 wt. % elastomer-modified graft copolymer and about 5 wt. % to about 65 wt. % graft (co)polymer, based on the total weight of the impact modifier. In another embodiment, such impact modifiers comprise about 50 wt. % to about 85 wt. %, more specifically about 75 wt. % to about 85 wt. % rubber-modified graft copolymer, together with about 15 wt. % to about 50 wt. %, more specifically about 15 wt. % to about 25 wt. % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^g)C(O)OCH_2CH_2R^h$, wherein $R^g$ is hydrogen or a $C_1$-$C_8$ linear or branched hydrocarbyl group and $R^h$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (9) or (10), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy) methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methaacryloxypropyl)methyldimethoxysilane, to afford silicone rubber having an average particle size from about 100 nanometers to about 2 micrometers. At least one branched acrylate rubber monomer is then polymerized with the silicone rubber particles, optionally in the presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

In one embodiment the foregoing types of impact modifiers are prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. This emulsion polymerization process is described and disclosed in various patents and literature of such companies as Rohm & Haas and General Electric Company. In the practice, any of the above-described impact modifiers may be used providing it is free of the alkali metal salts of fatty acids, alkali metal carbonates and other basic materials.

A specific impact modifier of this type is a methacrylonitrile-butadiene-stryrene (MBS) impact modifier wherein the butadiene substrate is prepared using above-described sulfonates, sulfates, or phosphates as surfactants. It is also preferred that the impact modifier have a pH of about pH 3 to about pH 8, specifically about pH 4 to about pH 7.

In some embodiments, the impact modifier is a graft polymer having a high rubber content, i.e., greater than or equal to about 50 wt. %, optionally greater than or equal to about 60 wt. % by weight of the graft polymer. The rubber is preferably present in an amount less than or equal to about 95 wt. %, optionally less than or equal to about 90 wt. % of the graft polymer.

The rubber forms the backbone of the graft polymer, and is preferably a polymer of a conjugated diene having the formula (11):

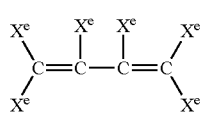

(11)

wherein $X^e$ is hydrogen, $C_1$-$C_5$ alkyl, chlorine, or bromine. Examples of dienes that may be used are butadiene, isoprene, 1,3-hepta-diene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures comprising at least one of the foregoing dienes, and the like. A preferred conjugated diene is butadiene. Copolymers of conjugated dienes with other monomers may also be used, for example copolymers of butadiene-styrene, butadiene-acrylonitrile, and the like. Alternatively, the backbone may be an acrylate rubber, such as one based on n-butyl acrylate, ethylacrylate, 2-ethylhexylacrylate, mixtures comprising at least one of the foregoing, and the like. Additionally, minor amounts of a diene may be copolymerized in the acrylate rubber backbone to yield improved grafting.

After formation of the backbone polymer, a grafting monomer is polymerized in the presence of the backbone polymer. One preferred type of grafting monomer is a monovinylaromatic hydrocarbon having the formula (12):

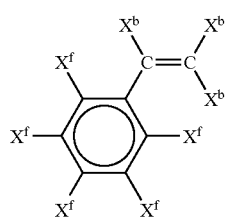

(12)

wherein $X^b$ is as defined above and $X^f$ is hydrogen, $C_1$-$C_{10}$ alkyl, $C_1$-$C_{10}$ cycloalkyl, $C_1$-$C_{10}$ alkoxy, $C_6$-$C_{18}$ alkyl, $C_6$-$C_{18}$ aralkyl, $C_6$-$C_{18}$ aryloxy, chlorine, bromine, and the like. Examples include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, mixtures comprising at least one of the foregoing compounds, and the like.

A second type of grafting monomer that may be polymerized in the presence of the polymer backbone are acrylic monomers of formula (13):

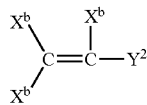

wherein $X^b$ is as previously defined and $Y^2$ is cyano, $C_1$-$C_{12}$ alkoxycarbonyl, or the like. Examples of such acrylic monomers include acrylonitrile, ethacrylonitrile, methacrylonitrile, alpha-chloroacrylonitrile, beta-chloroacrylonitrile, alpha-bromoacrylonitrile, beta-bromoacrylonitrile, methyl acrylate, methyl methacrylate, ethyl acrylate, butyl acrylate, propyl acrylate, isopropyl acrylate, mixtures comprising at least one of the foregoing monomers, and the like.

A mixture of grafting monomers may also be used, to provide a graft copolymer. Preferred mixtures comprise a monovinylaromatic hydrocarbon and an acrylic monomer. Preferred graft copolymers include acrylonitrile-butadiene-styrene (ABS) and methacrylonitrile-butadiene-stryene (MBS) resins. Suitable high-rubber acrylonitrile-butadiene-styrene resins are available from General Electric Company as BLENDEX® grades 131, 336, 338, 360, and 415.

The composition includes an aromatic vinyl copolymer, for example, a styrenic copolymer (also referred to as a "polystyrene copolymer"). The terms "aromatic vinyl copolymer" and "polystyrene copolymer" and "styrenic copolymer", as used herein, include polymers prepared by methods known in the art including bulk, suspension, and emulsion polymerization employing at least one monovinyl aromatic hydrocarbon. The polystyrene copolymers may be random, block, or graft copolymers. Examples of monovinyl aromatic hydrocarbons include alkyl-, cycloalkyl-, aryl-, alkylaryl-, aralkyl-, alkoxy-, aryloxy-, and other substituted vinylaromatic compounds, as combinations thereof. Specific examples include: styrene, 4-methylstyrene, 3,5-diethylstyrene, 4-n-propylstyrene, α-methylstyrene, α-methylvinyltoluene, α-chlorostyrene, α-bromostyrene, dichlorostyrene, dibromostyrene, tetrachlorostyrene, and the like, and combinations thereof. The preferred monovinyl aromatic hydrocarbons used are styrene and α-methylstyrene.

The aromatic vinyl copolymer contains a comonomer, such as vinyl monomers, acrylic monomers, maleic anhydride and derivates, and the like, and combinations thereof. As defined herein, vinyl monomers are aliphatic compounds having at least one polymerizable carbon-carbon double bond. When two or more carbon-carbon double bonds are present, they may be conjugated to each other, or not. Suitable vinyl monomers include, for example, ethylene, propylene, butenes (including 1-butene, 2-butene, and isobutene), pentenes, hexenes, and the like; 1,3-butadiene, 2-methyl-1,3-butadiene (isoprene), 1,4-pentadiene, 1,5-hexadiene, and the like; and combinations thereof.

Acrylic monomers include, for example, acrylonitrile, ethacrylonitrile, methacrylonitrile, α-chloroarylonitrile, β-chloroacrylonitrile, α-bromoacrylonitrile, and β-bromoacrylonitrile, methyl acrylate, methyl methacrylate, ethyl acrylate, butyl acrylate, propylacrylate, isopropyl acrylate, and the like, and mixtures thereof.

Maleic anhydride and derivatives thereof include, for example, maleic anhydride, maleimide, N-alkyl maleimide, N-aryl maleimide or the alkyl- or halo-substituted N-arylmaleimides, and the like, and combinations thereof.

The amount of comonomer(s) present in the aromatic vinyl copolymer can vary. However, the level is generally present at a mole percentage of about 2% to about 75%. Within this range, the mole percentage of comonomer may specifically be at least 4%, more specifically at least 6%. Also within this range, the mole percentage of comonomer may specifically be up to about 50%, more specifically up to about 25%, even more specifically up to about 15%. Specific polystyrene copolymer resins include poly(styrene maleic anhydride), commonly referred to as "SMA" and poly(styrene acrylonitrile), commonly referred to as "SAN".

In one embodiment, the aromatic vinyl copolymer comprises (a) an aromatic vinyl monomer component and (b) a cyanide vinyl monomer component. Examples of (a) the aromatic vinyl monomer component include a-methylstyrene, o-, m-, or p-methylstyrene, vinyl xylene, monochlorostyrene, dichlorostyrene, monobromostyrene, dibromostyrene, fluorostyrene, p-tert-butylstyrene, ethylstyrene, and vinyl naphthalene, and these substances may be used individually or in combinations. Examples of (b) the cyanide vinyl monomer component include acrylonitrile and methacrylonitrile, and these may be used individually or in combinations of two or more. There are no particular restrictions on the composition ratio of (a) to (b) in the aromatic vinyl copolymer thereof, and this ratio should be selected according to the application in question. Optionally, the aromatic vinyl copolymer can contain about 95 wt. % to about 50 wt. % (a), optionally about 92 wt. % to about 65 wt. % (a) by weight of (a)+(b) in the aromatic vinyl copolymer and, correspondingly, about 5 wt. % to about 50 wt. % (b), optionally about 8 wt. % to about 35 wt. % (b) by weight of (a)+(b) in the aromatic vinyl copolymer.

The weight average molecular weight (Mw) of the aromatic vinyl copolymer can be 30,000 to 200,000, optionally 30,000 to 110,000, measured by gel permeation chromatography.

Methods for manufacturing the aromatic vinyl copolymer include bulk polymerization, solution polymerization, suspension polymerization, bulk suspension polymerization and emulsion polymerization. Moreover, the individually copolymerized resins may also be blended. The alkali metal content of the aromatic vinyl copolymer can be about 1 ppm or less, optionally about 0.5 ppm or less, for example, about 0.1 ppm or less, by weight of the aromatic vinyl copolymer. Moreover, among alkali metals, the content of sodium and potassium in component (b) can be about 1 ppm or less, and optionally about 0.5 ppm or less, for example, about 0.1 ppm or less.

In one embodiment, the aromatic vinyl copolymer comprises "free" styrene-acrylonitrile copolymer (SAN), i.e., styrene-acrylonitrile copolymer that is not grafted onto another polymeric chain. In a particular embodiment, the free styrene-acrylonitrile copolymer may have a molecular weight of 50,000 to about 200,000 on a polystyrene standard molecular weight scale and may comprise various proportions of styrene to acrylonitrile. For example, free SAN may comprise about 75 wt. % styrene and about 25 wt. % acrylonitrile based on the total weight of the free SAN copolymer. Free SAN may optionally be present by virtue of the addition of a grafted rubber impact modifier in the composition that contains free SAN, and/or free SAN may by present independent of the impact modifier in the composition.

The composition may comprise about 2 wt. % to about 25 wt. % free SAN, optionally about 2 wt. % to about 20 wt. % free SAN, for example, about 5 wt. % to about 15 wt. % free SAN or, optionally, about 7.5 wt. % to about 10 wt. % free SAN, by weight of the composition as shown in the examples herein.

The composition also includes a mineral filler such as talc. Talc comprises naturally occurring and/or synthetically prepared talc. Pure talc has the chemical composition 3MgO·4SiO$_2$·H$_2$O and accordingly has an MgO content of about 31.9 wt. %, an SiO$_2$ content of about 63.4 wt. % and a content of chemically bonded water of about 4.8 wt. %. Naturally occurring talcs generally do not have the ideal composition mentioned above, since they are rendered impure by the partial replacement of the magnesium by other elements, by the partial replacement of silicon by, for example, aluminum, and/or by intergrowths with other minerals such as, for example, dolomite (calcium magnesium carbonate), magnesite (magnesium carbonate) and chlorite (magnesium, iron and aluminosilicates). Therefore, talc can be characterized by gradations of purity, meaning gradations in impurity content.

Grades of talc include high purity talc, which is commonly described as containing less than about 1% aluminum oxide, less than about 1% iron oxide, and less than about 1% of other impurities, by weight of the talc.

In one embodiment, a low impurity thermoplastic composition comprises less than or equal to about 400 ppm iron by weight of the composition, optionally less than or equal to about 300 ppm iron. "Ppm" means parts per million by weight, calculated as the weight of the impurity multiplied by one million and divided by the weight of the sample. In each case, the ppm is calculated for the elemental form of the impurity ("as the metal"). In some embodiments, a low impurity thermoplastic composition comprises less than or equal to about 200 ppm or, optionally, less than or equal to about 100 ppm iron.

In other embodiments, a low impurity thermoplastic composition comprises less than or equal to (i.e., not more than) about 1,000 ppm aluminum, optionally less than or equal to about 500 ppm aluminum, and in some embodiments, less than or equal to about 250 ppm aluminum, by weight of the composition.

As used herein, "primary impurities" refers to iron, aluminum, and calcium, and "secondary impurities" refers to chromium, manganese, nickel, potassium, sodium, titanium and zinc. "Total impurities" means primary impurities plus secondary impurities. Iron, aluminum, primary impurities and total impurities are generally not part of synthetic polymeric materials until carried therein as part of additives thereto such as mineral fillers.

In some embodiments, a low impurity thermoplastic composition comprises less than or equal to about 1,800 ppm primary impurities by weight of the composition. Optionally, a low impurity thermoplastic composition comprises less than or equal to about 1,500 ppm primary impurities or, in some embodiments, less than or equal to about 1000 ppm primary impurities. In various other embodiments, a low impurity thermoplastic composition may comprise less than or equal to about 750 ppm primary impurities or, optionally, less than or equal to about 500 ppm primary impurities.

Optionally, a low impurity thermoplastic composition comprises less than or equal to about 2,000 ppm total impurities by weight of the composition. Optionally, a low impurity thermoplastic composition comprises less than or equal to about 1,500 ppm total impurities or, in some embodiments, less than or equal to about 1000 ppm total impurities. In various other embodiments, a low impurity thermoplastic composition may comprise less than or equal to about 750 ppm total impurities or, optionally, less than or equal to about 500 ppm total impurities.

Some mineral fillers contain significantly more primary impurities than others, so the purity level of a filler may limit the amount of that filler that can be used in compositions as described herein. For example, some talcs sold as "high purity" talcs, contain impurities in amounts that limit the amount of the talcs that can be used in a low impurity composition as described herein. However, other talcs can be used in a wide range of proportions in the low impurity compositions described herein; some such talcs are mined in China and are commercially available. Other mineral fillers may be used as well, to the extent that they do not contribute excess impurities to the composition. To permit the use of common quantities of a filler in the compositions without defeating the surprising improvements in optical properties disclosed herein, a filler containing significantly less than 1 wt. % iron or total impurities and even significantly less than 0.5 wt. % iron or total impurities must be used. For example, to permit the use of talc in an amount of only 10% by weight of the composition without exceeding about 250 ppm iron in the composition, the talc must contain less than or equal to about 0.25% iron by weight of the talc, optionally less than or equal to about 0.25 wt. % primary impurities or, as another option, less than or equal to about 0.25 wt. % total impurities. In an embodiment of a thermoplastic composition comprising 50% talc by weight with not more than about 100 ppm iron, the talc must contain less than or equal to about 0.02% iron by weight of the talc, optionally less than or equal to about 0.02 wt. % primary impurities or, as another option, less than or equal to about 0.02 wt. % total impurities. In an embodiment of a thermoplastic composition comprising 50% talc by weight with not more than about 400 ppm iron, the talc must contain less than or equal to about 0.08% iron by weight of the talc, optionally less than or equal to about 0.08 wt. % primary impurities or, as another option, less than or equal to about 0.08 wt. % total impurities. In an embodiment of a thermoplastic composition comprising 50% talc by weight with not more than about 250 ppm iron in the composition, the talc must not contain less than or equal to about 0.05% iron by weight of the talc, optionally less than or equal to about 0.05 wt. % primary impurities or, as another option, less than or equal to about 0.05 wt. % total impurities. In an embodiment of a thermoplastic composition comprising 50% talc by weight with not more than about 150 ppm iron in the composition, the talc must not contain not more than about 0.03% iron by weight of the talc, optionally less than or equal to about 0.03 wt. % primary impurities or, as another option, less than or equal to about 0.03 wt. % total impurities. In some embodiments, the talc may contain less than or equal to about 0.01 wt. % iron, optionally less than or equal to about 0.01 wt. % primary impurities or, as another option, less than or equal to about 0.01 wt. % total impurities. It would not be assumed to one of ordinary skill in the art that a "high purity" talc described only as containing less than or equal to about 0.5 wt. % iron would contain not more than about 0.08 wt. % iron, since the latter proportion is nearly an order of magnitude less than the described iron content.

In one embodiment, a low impurity composition as described herein exhibits substantially no splay upon visual inspection after molding. The term "substantially no splay upon visual inspection" means that upon visual inspection, the article exhibits a surface substantially uniform in appearance between the gate area and the remainder of the body of the article.

Other features of a low impurity composition may include improved surface appearance and surface optical properties relative to like compositions that contain excessive quantities of talc impurities. Pertinent surface optical properties include some that have been standardized by the International Commission On Illumination (CIE) as L*, a measure of lightness/darkness; a*, a measure of redness/greenness; b*, a measure of blueness/yellowness; C*, a measure of chroma; and h°, a measure of hue. These properties are described more fully below. The composition may include various additives ordinarily incorporated in resin compositions of this type, with the proviso that the additives are preferably selected so as to not contribute excessive quantities of talc impurities or otherwise significantly defeat the superior surface quality of the thermoplastic composition. Mixtures of additives may be used. Such additives may be mixed at a suitable time during the mixing of the components for forming the composition. In some embodiments, the composition is substantially free of additives that catalyze the hydrolysis of polycarbonate.

Suitable fillers or reinforcing agents include any materials known for these uses, to the extent that they do not contribute an excess of impurities to the composition. For example, suitable fillers and reinforcing agents include silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; orgainc fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide(aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about zero to about 50 parts by weight, optionally about 1 to about 20 parts by weight, and in some embodiments, about 4 to about 15 parts by weight, based on 100 parts by weight of the polycarbonate resin, the aromatic vinyl copolymer and any impact modifier.

In various embodiments, the thermoplastic composition comprises about 45 wt. % to about 95 wt. % polycarbonate resin; optionally about 50 wt. % to about 85 wt. % polycarbonate. The thermoplastic composition can also comprise up to about 20 wt. % impact modifier; optionally about 0.1 wt. % to about 20 wt. % impact modifier; and in some embodiments about 2 wt. % to about 20 wt. % impact modifier. The thermoplastic composition may comprise about 2 wt. % to about 40 wt. % aromatic vinyl copolymer; optionally about 5 wt. % to about 15 wt. % aromatic vinyl copolymer and in some embodiments about 7.5 wt. % to about 10 wt. % aromatic vinyl copolymer. The composition may further contain about 0.1 wt. % to 50 wt. % mineral filler, optionally about 0.1 wt. % to about 20 wt. % mineral filler and in some embodiments, about 4 wt. % to about 15 wt. % mineral filler. All of the foregoing wt. % values are based on the combined weight of the polycarbonate resin, the impact modifier, the aromatic vinyl copolymer and the mineral filler. In illustrative embodiments, a low impurity composition may comprise about 45 wt. % to about 95 wt. % polycarbonate resin, about 2 wt. % to about 40 wt. % SAN, about 2 wt. % to about 20 wt. % ABS and about 0.1 wt. % to about 50 wt. % talc.

The compositions described herein may comprise a primary antioxidant or "stabilizer" (e.g., a hindered phenol and/or secondary aryl amine) and, optionally, a secondary antioxidant (e.g., a phosphate and/or thioester). Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 1 parts by weight, optionally about 0.05 to about 0.5 parts by weight, based on 100 parts by weight polycarbonate resin, aromatic vinyl copolymer and impact modifier.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 5 parts by weight, optionally about 0.05 to about 0.3 parts by weight, based on 100 parts by weight of polycarbonate resin, aromatic vinyl copolymer and impact modifier.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 10 parts by weight, optionally about 0.1 to about 1 parts by weight, based on 100 parts by weight of polycarbonate resin, aromatic vinyl copolymer and impact modifier.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 to about 5 parts by weight, based on 100 parts by weight of polycarbonate resin, aromatic vinyl copolymer and impact modifier.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of about 0.1 to about 20 parts by weight, optionally about 1 to about 10 parts by weight, based on 100 parts by weight of the polycarbonate resin, aromatic vinyl copolymer and impact modifier.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides, polyether-polyamide(polyetheramide) block copolymers, polyetheresteramide block copolymers, polyetheresters, or polyurethanes, each containing polyalkylene glycol moieties such as polyethylene glycol, polypropylene glycol, polytetramethylene glycol, and the like. Such polymeric antistatic agents are commercially available, such as, for example, Pelestat™ 6321 (Sanyo), Pebax™ MH1657 (Atofina), and Irgastat™ P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 0.1 to about 10 parts by weight, based on 100 parts by weight of polycarbonate resin, aromatic vinyl copolymer and impact modifier.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 to about 10 parts by weight, based on 100 parts by weight of polycarbonate resin, aromatic vinyl copolymer and impact modifier.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hyrdocarbon dyes; scintillation dyes such as oxazole or oxadiazole dyes; aryl- or heteroaryl-substituted poly($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5, 3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 0.1 to about 10 ppm, based on the weight of polycarbonate resin, aromatic vinyl copolymer and impact modifier.

Where a foam is desired, suitable blowing agents include, for example, low boiling halohydrocarbons and those that generate carbon dioxide; blowing agents that are solid at room temperature and when heated to temperatures higher than their decomposition temperature, generate gases such as nitrogen, carbon dioxide or ammonia gas, such as azodicarbonamide, metal salts of azodicarbonamide, 4,4' oxybis (benzenesulfonylhydrazide), sodium bicarbonate, ammonium carbonate, or the like; or combinations comprising at least one of the foregoing blowing agents. Blowing agents are generally used in amounts of about 0.5 to about 20 parts by weight, based on 100 parts by weight of polycarbonate resin, aromatic vinyl copolymer and impact modifier.

Suitable flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

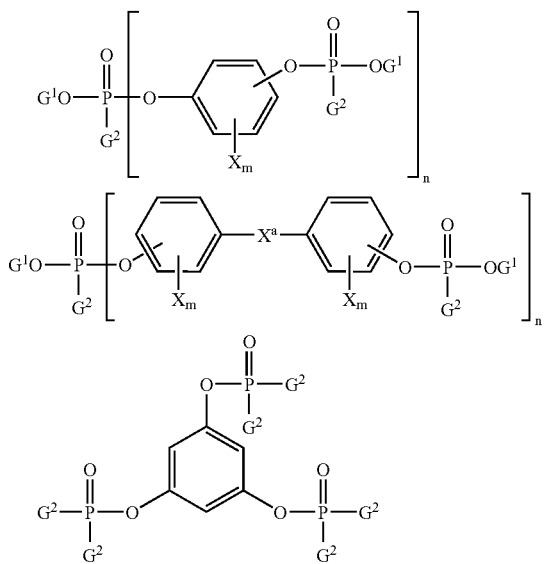

wherein each $G^1$ is independently a hydrocarbon having 1 to about 30 carbon atoms; each $G^2$ is independently a hydrocarbon or hydrocarbonoxy having 1 to about 30 carbon atoms; each $X_m$ is independently a bromine or chlorine; m is 0 to 4, Xa is as defined above for formulas 4 and 5; and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants are generally present in amounts of about 1 to about 20 parts by weight, based on 100 parts by weight of polycarbonate resin, aromatic vinyl copolymer and impact modifier.

Halogenated materials may also be used as flame retardants, for example halogenated compounds and resins of formula (14):

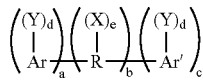 (14)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (14) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar', can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants are generally present in amounts of about 1 to about 50 parts by weight, based on 100 parts by weight of polycarbonate resin and any impact modifier.

In other embodiments, the thermoplastic composition may be essentially free of chlorine and bromine. Essentially free of chlorine and bromine as used herein refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine may be defined as having a bromine and/or chlorine content of less than or equal to about 100 parts per million by weight of the composition (ppm), less than or equal to about 75 ppm, or less than or equal to about 50 ppm. When this definition is applied to the fire retardant it is based on the total weight of the fire retardant. When this definition is applied to the thermoplastic composition it is based on the total weight of polycarbonate, impact modifier and fire retardant.

Inorganic flame retardants may also be used, for example salts of $C_{2-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complexes such as $Li_3AlF_6$, $BaSiF_6$, $KBF_4$, $K_3AlF_6$, $KAlF_4$, $K_2SiF_6$, and/or $Na_3AlF_6$ or the like.

When present, inorganic flame retardant salts are generally present in amounts of about 0.01 to about 25 parts by weight, more specifically about 0.1 to about 10 parts by weight, based on 100 parts by weight of polycarbonate resin, aromatic vinyl copolymer and impact modifier.

Another useful type of flame retardant is a polysiloxane-polycarbonate copolymer having polydiorganosiloxane blocks comprising repeating structural units of formula (15):

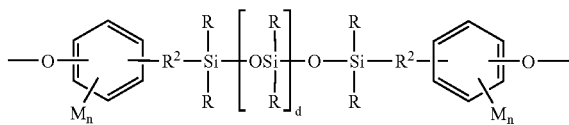

(15)

wherein each occurrence of R is the same as or different from the others, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer. R2 in formula (15) is a divalent $C_1$-$C_8$ aliphatic group. Each M in formula (15) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In formula (15), d is selected so as to provide an effective level of flame retardance to the thermoplastic composition. The value of d will therefore vary depending on the type and relative amount of each component in the thermoplastic composition, including the type and amount of polycarbonate, impact modifier, polysiloxane-polycarbonate copolymer, and other flame retardants. Suitable values for d may be determined by one of ordinary skill in the art without undue experimentation using the guidelines taught herein. Generally, d has an average value of 2 to about 1000, specifically about 10 to about 100, more specifically about 25 to about 75. In one embodiment, d has an average value of about 40 to about 60, and in still another embodiment, d has an average value of about 50. Where d is of a lower value, e.g., less than about 40, it may be necessary to use a relatively larger amount of the polysiloxane-polycarbonate copolymer. Conversely, where d is of a higher value, e.g., greater than about 40, it may be necessary to use a relatively smaller amount of the polysiloxane-polycarbonate copolymer.

In one embodiment, M is independently bromo or chloro, a $C^1$-$C_3$ alkyl group such as methyl, ethyl, or propyl, a $C_1$-$C_3$ alkoxy group such as methoxy, ethoxy, or propoxy, or a $C_6$-$C_7$ aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

The polysiloxane-polycarbonate copolymer may be manufactured by reaction of the corresponding dihydroxy polysiloxane with a carbonate source and a dihydroxy aromatic compound of formula (3), optionally in the presence of a phase transfer catalyst as described above. Suitable conditions are similar to those useful in forming polycarbonates. Alternatively, the polysiloxane-polycarbonate copolymers may be prepared by co-reacting in a molten state, the dihydroxy monomers and a diaryl carbonate ester, such as diphenyl carbonate, in the presence of a transesterification catalyst as described above. Generally, the amount of dihydroxy polydiorganosiloxane is selected so as to produce a copolymer comprising about 1 to about 60 mole percent of polydiorganosiloxane blocks relative to the moles of polycarbonate blocks, and more generally, about 3 to about 50 mole percent of polydiorganosiloxane blocks relative to the moles of polycarbonate blocks. When present, the copolymers may be used in amounts of about 5 to about 50 parts by weight, more specifically about 10 to about 40 parts by weight, based on 100 parts by weight of polycarbonate component, the aromatic vinyl copolymer and the impact modifier composition.

Anti-drip agents may also be used, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents are generally used in amounts of about 0.1 to about 10 parts by weight, based on 100 parts by weight of polycarbonate component, the aromatic vinyl copolymer and the impact modifier composition.

The thermoplastic compositions may be manufactured by methods generally available in the art, for example, in one embodiment, in one manner of proceeding, powdered polycarbonate resin, impact modifier, aromatic vinyl copolymer and talc and other optional components are first blended, optionally with chopped glass strands or other fillers in a Henschel™ high speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

Shaped, formed, or molded articles comprising the polycarbonate compositions are also provided. The polycarbonate compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, electronic device casings and signs and the like. In addition, the polycarbonate compositions may be used for such applications as automotive panel and trim.

In some embodiments, the thermoplastic compositions described herein may have a Vicat B/50 of about 120° C. to about 140° C., more specifically about 126° C. to about 130° C., determined using a 4 mm thick bar per ISO 306.

Alternatively, or in addition, the thermoplastic compositions may have a Instrumented Impact Energy (dart impact) at maximum load of at least about 20 ft-lbs, preferably at least about 30 ft-lbs, determined using a 4-inch (10 cm) diameter disk at −30° C., ½-inch (12.7 mm) diameter dart, and an impact velocity of 6.6 meters per second (m/s) per ASTM D3763.

The compositions are further illustrated by the following non-limiting examples, which were prepared from the components set forth in Table 1.

TABLE 1

| Material | Description | Source |
|---|---|---|
| Polycarbonate (PC-1) | BPA polycarbonate resin made by an interfacial process with an MVR of 21.9-31.8 g/10 min. at 300° C./1.2 kg, and a molecular weight of 20,000 to 25,000 (absolute PC molecular weight scale). | GE Advanced Materials |
| Polycarbonate (PC-2) | BPA polycarbonate resin made by a melt or interfacial process with an MVR of 5.8-7.9 g/10 min at 300° C./1.2 kg and a molecular weight of 30,000 to 35,000 (absolute PC molecular weight scale). | GE Advanced Materials |
| ABS | High rubber graft emulsion polymerized ABS comprising about 50 wt. % polybutadiene, about 25 wt. % styrene and acrylonitrile grafted to the polybutadiene and about 25 wt. % free SAN | GE Advanced Materials |
| SAN | Styrene acrylonitrile copolymer comprising 15-35 wt. % acrylonitrile with an MVR of 13-24 cm³/10 min at 220° C./1.2 kg | GE Advanced Materials |

EXAMPLE 1

Each of three sample compositions were prepared by combining 73.8 wt. % polycarbonate (the polycarbonate being a 30/70 wt. % combination of PC-1 and PC-2, respectively), 8 wt. % ABS, 9.5 wt. % SAN and 8 wt. % talc, with about 0.7 wt. % additives including a phosphite stabilizer, a mold release agent and an antioxidant. Each sample was made with a different talc: talc 1, talc 2 and talc 3, which were all obtained commercially. Talc 1 and talc 2 were obtained from Specialty Minerals, Inc., under the trade designations MicroTalc MP 15-38 and Talc 9102, respectively. Talc 3 was obtained from Luzenac America under the trade designation Cimpact 710. Talc 1, talc 2 and talc 3 were all sold as "high purity" talc.

In each of the examples, samples were prepared by melt extrusion on a Werner & Pfleider™ 25 mm twin screw extruder at a nominal melt temperature of 288° C. (550° F.), 635 mm (25 inches) of mercury vacuum, and 500 rpm. Talc was added variously in powder form and as a concentrate in a talc-polycarbonate pellet.

The compositions were analyzed for talc impurities in an acid digestion process, with the results set forth in Table 2 in parts per million by weight of the composition. Such a process can be achieved by depositing a small sample (for example, about 0.45 grams) of the composition into a vessel with about 6 milliliters (ml) concentrated nitric acid ($HNO_3$), heating the mixture in a microwave oven to accelerate the reaction of the acid with the sample, adding about 1 ml concentrated HCl with swirling or gentle mixing, rinsing the residue into a collection flask using deionized water, and analyzing the water using an induction-coupled-plasma (ICP) spectrometer equipped with an ultrasonic nebulizer.

TABLE 2

| Impurity | Impurities (ppm) | | |
|---|---|---|---|
| | Sample 1 (made with Talc 1) | Sample 2 (made with Talc 2) | Sample 3 (made with Talc 3) |
| Aluminum | 1350 | 126 | 156 |
| Calcium | 203 | 1120 | 171 |
| Chromium | 0.1 | — | — |
| Iron | 496 | 92.5 | 126 |
| Manganese | 8 | 1.7 | 0.5 |
| Nickel | 0.4 | — | — |
| Potassium | 31 | 11.6 | 10.5 |
| Sodium | 17.2 | 6.1 | 6.5 |
| Titanium | 4.5 | 1.4 | 1.9 |
| Zinc | 8.6 | 3.9 | — |
| Total impurities | 2118.8 | 1363.2 | 472.6 |
| Primary impurities (Fe + Al + Ca) | 2049 | 1338.5 | 453 |

As seen from Table 2, sample 1 contained more than about 450 ppm iron, more than about 1000 ppm aluminum and more than about 200 ppm calcium. Sample 1 contained about 2100 ppm total impurities, including more than about 2000 ppm primary impurities, and does not qualify as a low impurity composition by any criterion set forth herein. In contrast, samples 2 and samples 3 both qualify as low impurity compositions. Parts molded from sample 1 exhibited a significant degree of splay, while samples 2 and 3 exhibited little or no splay.

Some of the samples were evaluated without pigment therein, others were provided with about 0.09 to 0.5 wt. % of a red, green, blue, yellow or white pigment mixture, by weight of the sample without the pigment.

Chips measuring about 5 cm×7 cm (2 inches×3 inches) were molded using a BOY™ 15-S 15T, 1 oz. molding machine. The color chips were analyzed under illumination sources that simulate International Commission On Illumination (CIE) standards $D_{65}$ cool fluorescence (CWF-2), and daylight (C) using a Gretag-Macbeth model Color EY 7000A color spectrophotometer, 2° observer at 360 to 750 nanometers (nm), including their specular components. The following surface quality characteristics were noted: L*, a, b, C, and h.

L* indicates lightness/darkness and is known in the art as the attribute of color perception by which a non-self-luminous body is judged to reflect more or less light. It is also known as the attribute by which a perceived color is judged to be equivalent to one of a series of grays ranging from black to white. L* is reported on a scale of 1 to 100, with 1 corresponding to black and 100 corresponding to white, based on a calibration using a white ceramic tile.

a* indicates redness/greenness and is known in the art for use in quantifying the difference between a specimen and a standard reference color. If "a" is positive, there is more redness than greenness relative to the standard; if "a" is negative, there is more greenness than redness relative to the standard.

b* indicates blueness/yellowness and is known in the art for use in quantifying the difference between a specimen and a standard reference color. If "b" is positive, there is more yellowness than blueness relative to the standard; if "b" is negative, there is more blueness than yellowness relative to the standard.

C* indicates chroma and is known in the art as the attribute of color used to indicate the degree of departure of the color from a gray of the same lightness. C* is also known in the CIE 1976 L*, a*, b* and L*, u*, v* systems as the quantities $C^*ab=(a^{*2}+b^{*2})^{1/2}$ and $C^*uv=(u^{*2}+v^{*2})^{1/2}$, respectively. Chroma is also known as an attribute of a visual perception, produced by an object color that permits a judgment to be made of the amount of pure chromatic color present, irrespective of the amount of achromatic color.

h° indicates hue and is known in the art as the attribute of color by means of which a color is perceived to be red, yellow, green, blue, purple, etc. Pure white, black, and grays possess no hue.

The results of the observations are set forth in Table 3. Each reported result is the average of three separate measurements.

TABLE 3

| Pigment | Sample | Illumination | L* | C* | h° | a* | b* |
|---|---|---|---|---|---|---|---|
| None | Sample 1 | $D_{65}$ | 67.13 | 6.14 | 97.41 | −0.79 | 6.09 |
| | | CWF-2 | 67.41 | 6.99 | 94.71 | −0.57 | 6.96 |
| | | C | 67.12 | 6.19 | 98.96 | −0.96 | 6.12 |
| | Sample 2 | $D_{65}$ | 75.64 | 4.98 | 108.15 | −1.55 | 4.73 |
| | | CWF-2 | 75.79 | 5.49 | 101.00 | −1.05 | 5.39 |
| | | C | 75.63 | 5.03 | 109.38 | −1.67 | 4.74 |
| | Sample 3 | $D_{65}$ | 75.58 | 4.78 | 118.58 | −2.29 | 4.20 |
| | | CWF-2 | 75.66 | 4.98 | 108.42 | −1.57 | 4.72 |
| | | C | 75.55 | 4.84 | 116.18 | −2.11 | 4.33 |
| Green | Sample 1 | $D_{65}$ | 43.48 | 30.28 | 169.83 | −29.81 | 5.35 |
| | | CWF-2 | 41.02 | 21.36 | 172.53 | −21.18 | 2.78 |
| | | C | 43.25 | 29.61 | 169.93 | −29.15 | 5.18 |
| | Sample 2 | $D_{65}$ | 43.66 | 30.76 | 169.56 | −30.26 | 5.57 |
| | | CWF-2 | 41.16 | 21.67 | 172.17 | −21.46 | 2.95 |
| | | C | 43.42 | 30.09 | 169.65 | −29.60 | 5.40 |
| Yellow | Sample 1 | $D_{65}$ | 73.78 | 66.91 | 79.16 | 12.59 | 65.72 |
| | | CWF-2 | 77.74 | 73.90 | 84.92 | 6.54 | 73.60 |
| | | C | 73.87 | 67.06 | 80.62 | 10.93 | 66.16 |
| | Sample 2 | $D_{65}$ | 75.93 | 70.87 | 77.12 | 15.80 | 69.09 |
| | | CWF-2 | 80.24 | 78.04 | 83.62 | 8.68 | 77.56 |
| | | C | 76.06 | 70.97 | 78.65 | 13.97 | 69.58 |

TABLE 3-continued

| Pigment | Sample | Illumination | L* | C* | h° | a* | b* |
|---|---|---|---|---|---|---|---|
| Blue | Sample 1 | $D_{65}$ | 43.68 | 18.81 | 286.45 | 5.33 | −18.04 |
| | | CWF-2 | 42.23 | 21.52 | 281.93 | 4.45 | −21.06 |
| | | C | 43.74 | 18.95 | 287.92 | 5.83 | −18.03 |
| | Sample 2 | $D_{65}$ | 44.32 | 19.44 | 286.03 | 5.37 | −18.68 |
| | | CWF-2 | 42.81 | 22.27 | 281.65 | 4.50 | −21.81 |
| | | C | 44.38 | 19.59 | 287.52 | 5.89 | −18.68 |
| White | Sample 1 | $D_{65}$ | 93.86 | 0.27 | 229.74 | −0.17 | −0.20 |
| | | CWF-2 | 93.82 | 0.98 | 280.08 | 0.17 | −0.97 |
| | | C | 93.87 | 0.43 | 264.29 | −0.04 | −0.42 |
| | Sample 2 | $D_{65}$ | 95.72 | 0.38 | 257.48 | −0.08 | −0.38 |
| | | CWF-2 | 95.66 | 1.28 | 282.44 | 0.28 | −1.25 |
| | | C | 95.73 | 0.61 | 275.56 | 0.06 | −0.61 |

The data in Table 3 shows that non-pigmented, low impurity compositions comprising 8 wt. % talc provide surprisingly superior optical surface quality in compositions relative to a corresponding high impurity composition comprising the same proportions of polymeric materials, pigments, additives, etc., as indicated by the differences in L*, C*, h°, a* and b* between sample 1 and samples 2 and 3. Superior optical surface quality is also evident from the differences in measurements between samples 1 and 2 with yellow and white pigments.

The data of the Table 3 indicates that by reducing impurities in a filled composition comprising polycarbonate, an aromatic vinyl copolymer, and an impact modifier, the composition can attain a lightness L* of greater than about 67, the L* of the high impurity sample. For example, the compositions described herein may exhibit an L* of about 70 or greater under any of the three specified types of illumination or, in some embodiments an L* of at least about 73. For example, the composition may have an L* of about 70 to about 75, optionally about L* 70 to about L* 73.

An composition with such improved lightness can be pigmented or painted to achieve a desired intensity or hue that in some cases would not be possible using a comparable, high impurity material, or in other cases that could be achieved but only by increasing or otherwise modifying the pigment or paint loading or formulation. Often such increases in pigment loading have a detrimental effect on the physical properties of articles made from the composition, such as reduced impact strength. The unpigmented compositions are useful as stock material for use in making unpigmented articles or pigmented articles having superior visual and optical surface qualities as described herein.

Similarly, the data indicates that unpigmented low impurity compositions can attain a chroma C* of less than 6 under $D_{65}$ or C illumination, for example, a C* of about 5.5 or less, optionally a C* of about 5.0 or less. For example, the disclosed sample compositions had C* values of about 5.5 to about 4.75. Under CWF-2 illumination, the compositions can attain a C* of 6.8 or less, optionally about 6 or less, for example, about 5.5. Under C illumination, the compositions can attain a C* of 6.0 or less, optionally about 5.5 or less, for example, about 5.

The data also indicates that low impurity compositions can attain a hue h° of about 97 or greater under CWF-2 illumination, optionally 100 or greater. Under $D_{65}$ illumination, the compositions can attain a hue h° of about 100 or greater, optionally a hue h° of about 105 or greater and, in some embodiments, a hue h° of about 110 or greater, optionally about 119 (sample 3). Under C illumination, the compositions can attain a hue h° of about 101 or greater, optionally a hue h° of about 105 or greater and, in some embodiments, a hue h° of about 110 or greater, optionally about 116 (sample 3).

These compositions may attain a redness/greenness a* of −1 or less, optionally −1.5 or less, for example, −2 or less, and a blueness/yellowness b* of less than 6, optionally 5.5 or less, for example 5 or less and in some embodiments, 4.5 or less.

The data also indicates that yellow and white-pigmented low impurity compositions may attain a lightness L* and/or a chroma C* that are greater than those of a corresponding high impurity composition comprising the same proportions of polymeric materials, pigments, additives, etc., by at least 1 or 2 points or, alternatively, a lightness L* and/or chroma C* that is at least about 5% greater than the L* and/or C* of a corresponding high impurity composition. A yellow- or white-pigmented low impurity composition may have a redness/greenness a* and/or a blueness/yellowness b* that are greater than those of a corresponding high impurity composition by at least 1 or 2 points; in some embodiments, by at least 5% or optionally by at least 10% and, in some cases, by at least 15%.

EXAMPLE 2

Additional samples designated Samples 4, 5 and 6 were prepared from components as set forth in Table 1, using talc 1, talc 2 and another talc designated talc 4, respectively. Talc 4 was obtained commercially under the designation Jetfine™ from Luzenac Group. The samples were prepared as described in Example 1. Samples designated 7, 8 and 9 were prepared in the same manner as Sample 4 except that instead of using solely talc 1, combinations of talc 1 and talc 2 were used in various proportions by weight: 25/75 (Sample 7), 50/50 (Sample 8) and 75/25 (Sample 9).

Samples 4-9 were all analyzed to determine their content of iron and other metals, as described above. The results are set forth in the following Table 4.

TABLE 4

Impurities, ppm

| | Samples | | | | | |
|---|---|---|---|---|---|---|
| Impurity | 4 | 5 | 6 | 7 | 8 | 9 |
| Aluminum | 1080 | 136 | 121 | 373 | 632 | 882 |
| Calcium | 73.8 | 245 | 242 | 199 | 171 | 126 |
| Chromium | 0.9 | 0.3 | 0.5 | 0.4 | 0.6 | 0.7 |
| Iron | 359 | 62.1 | 33.3 | 138 | 210 | 287 |
| Manganese | 5.6 | 0.7 | 1.6 | 1.8 | 3.2 | 4.3 |

TABLE 4-continued

Impurities, ppm

| Impurity | Samples | | | | | |
|---|---|---|---|---|---|---|
| | 4 | 5 | 6 | 7 | 8 | 9 |
| Nickel | 0.9 | 2 | 0.5 | 0.7 | 0.6 | 0.5 |
| Potassium | 13.9 | 4.9 | 8.6 | 5.2 | 12.6 | 10.6 |
| Sodium | 5.4 | 2.5 | 3.7 | 3.2 | 7.9 | 4.4 |
| Titanium | 5.3 | 1.6 | 0.8 | 2.2 | 2.6 | 3.6 |
| Zinc | 1.4 | 0.4 | 1.3 | 0.4 | 4.8 | 1.5 |
| Total Impurities | 1546 | 456 | 413 | 724 | 1045 | 1321 |
| Primary Impurities (Fe + Al + Ca) | 1513 | 443 | 396 | 710 | 1013 | 1295 |

Table 4 shows that all of Samples 4-9 contained less than 400 ppm iron and less than 2000 total impurities (including primary impurities). The low iron in Sample 4 relative to Sample 1 (Example 1) is believed to be due to lot-to-lot variation in the talc. The samples were all tested for L*, C*, H*, a* and b* as described above. The results are set forth in the following Table 5.

TABLE 5

| Sample | Talc | Illum Source | L* | C* | h* | a* | b* |
|---|---|---|---|---|---|---|---|
| Sample 4 | Talc 1 | D65 | 69.08 | 11.01 | 89.02 | 0.19 | 11.00 |
| | | CWF-2 | 69.54 | 12.41 | 89.61 | 0.08 | 12.41 |
| | | C | 69.10 | 11.12 | 91.40 | −0.27 | 11.12 |
| Sample 5 | Talc 2 | D65 | 82.74 | 13.84 | 97.97 | −1.92 | 13.71 |
| | | CWF-2 | 83.21 | 15.52 | 95.25 | −1.42 | 15.45 |
| | | C | 82.75 | 14.06 | 99.97 | −2.43 | 13.85 |
| Sample 6 | Talc 4 | D65 | 79.18 | 10.85 | 98.88 | −1.68 | 10.72 |
| | | CWF-2 | 79.53 | 12.14 | 95.75 | −1.22 | 12.08 |
| | | C | 79.18 | 11.03 | 100.87 | −2.08 | 10.83 |
| Sample 7 | Talc 1/ talc 2 = 25/75 wt. % | D65 | 78.01 | 13.39 | 93.98 | −0.93 | 13.36 |
| | | CWF-2 | 78.52 | 15.08 | 92.74 | −0.72 | 15.06 |
| | | C | 78.03 | 13.58 | 96.15 | −1.45 | 13.50 |
| Sample 8 | Talc 1/ talc 2 = 50/50 wt. % | D65 | 74.58 | 12.47 | 91.59 | −0.35 | 12.46 |
| | | CWF-2 | 75.08 | 14.05 | 91.22 | −0.30 | 14.05 |
| | | C | 74.60 | 12.62 | 93.86 | −0.85 | 12.59 |
| Sample 9 | Talc 1/ talc 2 = 75/25 wt. % | D65 | 71.93 | 11.69 | 90.26 | −0.05 | 11.69 |
| | | CWF-2 | 72.41 | 13.18 | 90.37 | −0.09 | 13.18 |
| | | C | 71.95 | 11.82 | 92.59 | −0.53 | 11.81 |

The data of Table 5 shows again that when iron content is low, improved L* is attained, since all of the sample compositions had iron content below about 400 ppm, and all had an L* of about 70 or greater.

Taken together, the data of Example 1 and Example 2 indicate an R2 correlation of iron content and L* of about 0.87 and an R2 correlation of L* and total primary impurities of about 0.79.

The compositions described herein can be used with or without pigments to produce articles that have reduced or substantially no splay and that exhibit improved visual and optical characteristics, including improved colorability, as may be measured by one or more of lightness, chroma, hue, redness/greenness and blueness/yellowness.

The singular forms "a," "an," and "the" include plural referents unless the context clearly dictates otherwise. The endpoints of all ranges reciting the same characteristic are combinable and inclusive of the recited endpoints. All references are incorporated herein by reference. Compounds are described using standard nomenclature. For example, any position not substituted by any indicated group is understood to have its valency filled by a bond as indicated, or a hydrogen atom. A dash ("–") that is not between two letters or symbols is used to indicate a point of attachment for a substituent. For example, —CHO is attached through carbon of the carbonyl group. The modifier "about" used in connection with a quantity is inclusive of the stated value and has the meaning dictated by the context (e.g., includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. A thermoplastic composition, comprising:
   a polycarbonate resin;
   an aromatic vinyl copolymer;
   an impact modifier; and
   a mineral filler;
   wherein the composition has a lightness L* of greater than or equal to about 70 under one or more of CIE $D_{65}$, CWF-2 or C illumination using a 2° observer at 360 to 750 nanometers (nm), including specular components, and
   wherein the composition contains less than or equal to about 2000 ppm primary impurities by weight of the composition.

2. The composition of claim 1, wherein the composition has a lightness L* of greater than or equal to about 73.

3. The composition of claim 1, wherein the composition has a lightness L* or greater than or equal to about 75.

4. The composition of claim 1, comprising about 10 to about 50 wt. % mineral filler by weight of the composition.

5. The composition of claim 1 wherein the aromatic vinyl copolymer comprises SAN and the impact modifier comprises ABS.

6. A thermoplastic composition, comprising:
   a polycarbonate resin;
   an aromatic vinyl copolymer;
   an impact modifier; and
   a mineral filler;
   wherein the composition contains less than or equal to about 400 ppm iron by weight of the composition, and
   wherein the composition contains less than or equal to about 2000 ppm primary impurities by weight of the composition.

7. The composition of claim 6, wherein the composition contains less than or equal to about 200 ppm iron by weight of the composition.

8. The composition of claim 6, wherein the composition contains less than or equal to about 150 ppm iron by weight of the composition.

9. The composition of claim 6, wherein the composition contains less than or equal to about 1000 ppm aluminum.

10. The composition of claim 6, wherein the composition contains less than or equal to about 2000 ppm total impurities by weight of the composition.

11. The composition of claim 6, comprising about 10 to about 50 wt. % mineral filler by weight of the composition.

12. The composition of claim 7, comprising about 10 to about 50 wt. % mineral filler by weight of the composition.

13. The composition of claim 6, comprising about 4 to about 15 wt. % mineral filler by weight of the composition.

14. The composition of claim 6, comprising talc that comprises less than or equal to about 0.08% iron by weight of the talc.

15. The composition of claim 6, wherein the aromatic vinyl copolymer comprises a styrenic copolymer.

16. The composition of claim 6 wherein the aromatic vinyl copolymer comprises SAN and the impact modifier comprises ABS.

17. The composition of claim 6, comprising about 45 wt. % to about 95 wt. % polycarbonate resin, about 2 wt. % to about 40 wt. % SAN, about 2 wt. % to about 20 wt. % ABS and about 0.1 to about 50 wt. % talc.

18. The composition of claim 6, wherein an article formed from the composition exhibits substantially no splay upon visual inspection after molding.

19. An article comprising the composition of claim 1.

20. A method for forming an article, comprising molding, extruding, shaping or forming the composition of claim 1 to form the article.

21. An article comprising the composition of claim 6.

* * * * *